United States Patent [19]
Matsuda et al.

[11] Patent Number: 5,839,795
[45] Date of Patent: *Nov. 24, 1998

[54] VARIABLE OUTER DIAMETER WHEEL FOR VEHICLES

[75] Inventors: Yutaka Matsuda; Kaoru Shimizu, both of Osaka, Japan

[73] Assignee: Matsushita Electric Industrial Co., Ltd., Osaka, Japan

[ * ] Notice: The term of this patent shall not extend beyond the expiration date of Pat. No. 5,407,054.

[21] Appl. No.: 740,092

[22] Filed: Oct. 24, 1996

Related U.S. Application Data

[63] Continuation of Ser. No. 377,019, Jan. 20, 1995, abandoned.

[30] Foreign Application Priority Data

Jan. 28, 1994 [JP] Japan .................................. 6-008250
May 12, 1994 [JP] Japan .................................. 6-098514

[51] Int. Cl.[6] .................................................. B60B 15/00
[52] U.S. Cl. .............................. 301/5.1; 301/16; 301/45; 305/4
[58] Field of Search .................................. 301/1, 5.1, 16, 301/104, 40.3, 45, 46; 305/4, 5, 6, 7, 15, 19, 60; 474/47, 49, 50, 51; 242/571, 577.1, 577.2, 577.3

[56] References Cited

U.S. PATENT DOCUMENTS

| | | |
|---|---|---|
| 3,802,743 | 4/1974 | Hermanns .................................. 301/5.1 |
| 5,407,054 | 4/1995 | Matsuda et al. . |
| 5,480,022 | 1/1996 | Matsuda et al. . |
| 5,492,390 | 2/1996 | Kugelmann, Sr. ........................ 301/5.1 |

FOREIGN PATENT DOCUMENTS

| | | |
|---|---|---|
| 2700143 | 7/1994 | France . |
| 55-25551 | 2/1980 | Japan . |
| 55-156706 | 12/1980 | Japan . |
| 3-20420 | 3/1989 | Japan . |
| 3-259843 | 11/1991 | Japan . |
| 1415619 | 12/1990 | U.S.S.R. .................................. 301/5.1 |
| 1772479 | 10/1992 | U.S.S.R. .................................. 474/51 |
| 1108547 | 1/1966 | United Kingdom . |
| 2118496 | 11/1983 | United Kingdom . |

OTHER PUBLICATIONS

European Search Report dated May 15, 1995.

*Primary Examiner*—Russell D. Stormer
*Attorney, Agent, or Firm*—Ratner & Prestia

[57] ABSTRACT

A variable outer diameter wheel includes a generally cylindrical pipe or drum having four equally spaced penetrating holes or receiving parts in the cylindrical wall, a diaphragm sealing member corresponding to each of the penetrating holes and fitted to the pipe support, and sliders forming a wheel peripheral face so that the sliders can smoothly slide in the penetrating holes. The sliders are pushed or activated and moved outward from the pipe in a direction so the wheel outer diameter is enlarged by compressed air supplied through a passage and a hole provided in an axle which support the wheel. Exhausting the compressed air causes the wheel outer diameter to decrease and restores the wheel to its original size. Variable outer diameter wheels permit safe operation of vehicles on frozen, snow-clad or irregular surfaced roads.

22 Claims, 7 Drawing Sheets

VARIABLE OUTER DIAMETER WHEEL FOR VEHICLES

This application is a continuation of application Ser. No. 08/377,019 filed Jan. 20, 1995 now abandoned.

BACKGROUND OF THE INVENTION

1. Field of the Invention

The present invention relates to a variable outer diameter wheel in which the outer diameter of the wheel varies and relates to a vehicle providing the variable outer diameter wheels.

2. Description of the Prior Art

For vehicles such as conventional automobiles and motor bicycles powered with combustion engines or bicycles without engines, means for preventing slip and skid accidents on frozen and snow-clad roads is by use of studded tires or tire chains.

For farming vehicles and wheel chairs, variable outer diameter wheels can be used to facilitate running independent of road surface conditions.

In electric automobiles, it has been suggested to make the outer diameter of the wheel large for use as a speed varying means in order to increase running efficiency.

Variable outer diameter wheels using fluid such as compressed air are shown in Japanese Patent Laid Open Application 55-156706 in which tires are expanded and Japanese Utility Model 55-25551 in which a certain link mechanism and means go-in/out of a link by a tapered cam.

Further, a variable outer diameter roller using fluid such as compressed air is shown in Japanese Patent Laid Open Application 3-20420 and Japanese Patent Laid Open Application 3-259843, in which a roller is proposed which by supplying fluid (for example, air) into a tubular and elastic pressure chamber (including a combination of a plurality of pressure chambers) fixed to a rotary axis, the tubular elastic body is expanded and the outer diameter of the roller is enlarged.

However, because spiked tires can increase dust pollution, they are undesirable from the standpoint of preserving a good environment. In the case of chained tires, the chains are troublesome to attach or detach.

The variable outer diameter wheel shown in Japanese Utility Model 55-25551 uses a link mechanism and a tapered cam and its construction is complex with a number of parts. Accordingly, such a device takes a great deal of time to assemble and is therefore expensive.

In a construction in which tires or rollers are expanded by supplying fluid, if the variation in ratio between the outer diameter of tires or tubular elastics at full expansion and at a normal state of inflation is large, for example, when the ratio is over 50%, repeated expansion and contraction increases the probability of fatigue breakdown due to tension, even in elastics like rubber.

High pressure fluid, for example compressed air of about 5 kgf/cm$^2$ is used to support a vehicle carrying a heavy load.

In the case of tubular elastics used in the present art, variation in the quantity and tension in a peripheral direction at expansion become remarkably large.

Because of the short fatigue life elastic materials such as rubber, are restricted for use in such applications.

SUMMARY OF THE INVENTION

To solve the above problems, a variable outer diameter wheel in accordance with the present invention has a construction wherein the outer diameter of the wheel enlarges when a plurality of sliders set radially are moved by fluid (e.g. air, oil) pressure.

A vehicle is provided with the variable outer diameter wheels in which the outer diameters are varied by the supplied fluid.

According to the invention, parts of the wheel corresponding to the studded portion of a studded tire or friction function of a chained tire are thrust against frozen and snow-clad roads.

When the roads are not frozen or snow-clad, the outer diameter of the wheel can be decreased by attaching rubber parts or plastic parts corresponding to a tire on the cylindrical face (outer peripheral face) made of material that will function like studs or chains.

The variable outer diameter wheel according to the invention is constructed with sealing parts having pot-shaped elastic diaphragms disposed in a plurality of penetrating holes made on the cylindrical wall of a pipe tightly fitted to side plates, with a slider forming a wheel peripheral face fitted in to each penetrating hole so that the sliders can slide in the relationship to the holes, the sealing part and the pipe are in air tight relationship between an axle having a passage for supplying fluid which exerts pressure (pushes) on the diaphragms. Side plates are put on both sides of the sealing part and the pipe, and the sliders are pushed and moved in a direction so that the outer diameter of the wheel is enlarged by fluid (for example, compressed air) supplied from a rotary coupling connected to the axle through the passage in the axle to the diaphragms.

The pot-shaped diaphragms attached inside the tightly closed pipe are deformed into a plate by the fluid supplied through the passage in the axle. At the same time, the sliders which are disposed in the part of the diaphragms which penetrate the holes on the cylindrical wall of the pipe are pushed out of the pipe. As a result, arc parts, which are located on the tops of the sliders and form a wheel peripheral face, are pushed out a designated distance and the wheel increases to a desired outer diameter.

The side plates restrict range of movement (upper dead point) of the sliders.

On the cylindrical wall (peripheral wall) of the side plates, either a rubber tire or a tire containing a rubber tube having a designated pressure is attached.

In the variable outer diameter wheel, the compressed air in the pipe is exhausted when running at lower speed or on roads that are free of ice or snow. The sliders are pushed back to the original positions in the diaphragms of the sealing part by ring-shaped coil springs or rubber rings provided in the grooves on the peripheral parts of the wheel. As a result, the arc parts on the tops of the sliders form a wheel within the original small outer diameter.

DESCRIPTION OF THE EXEMPLARY EMBODIMENTS

Figure 1:
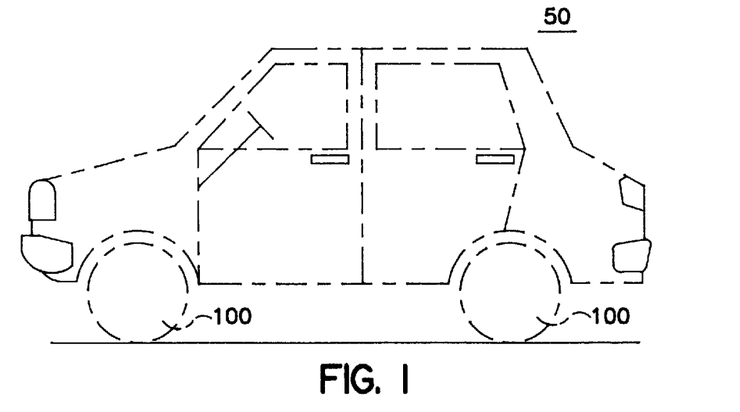
FIG. 1 is a side view of a vehicle having variable outer diameter wheels in accordance with an exemplary embodiment of the present invention.

FIG. 1 is a side view of a vehicle to use variable outer diameter wheels in accordance with an exemplary embodiment of the present invention. The vehicle 50, such as a four wheeled automobile, is provided with variable outer diameter wheels 100 mounted for rotation about an axle near the four corners of the bottom of the vehicle body through ball bearings or bearings made out of, for example cylindrical metal.

The rotation of the variable outer diameter wheel 100 is by conventional automobile drive means. Power is transferred from an internal combustion engine fueled by gasoline, alcohol, hydrogen gas, natural gas etc., or by a battery driven motor, through a gear coupling and an axle (not shown).

Figure 2:
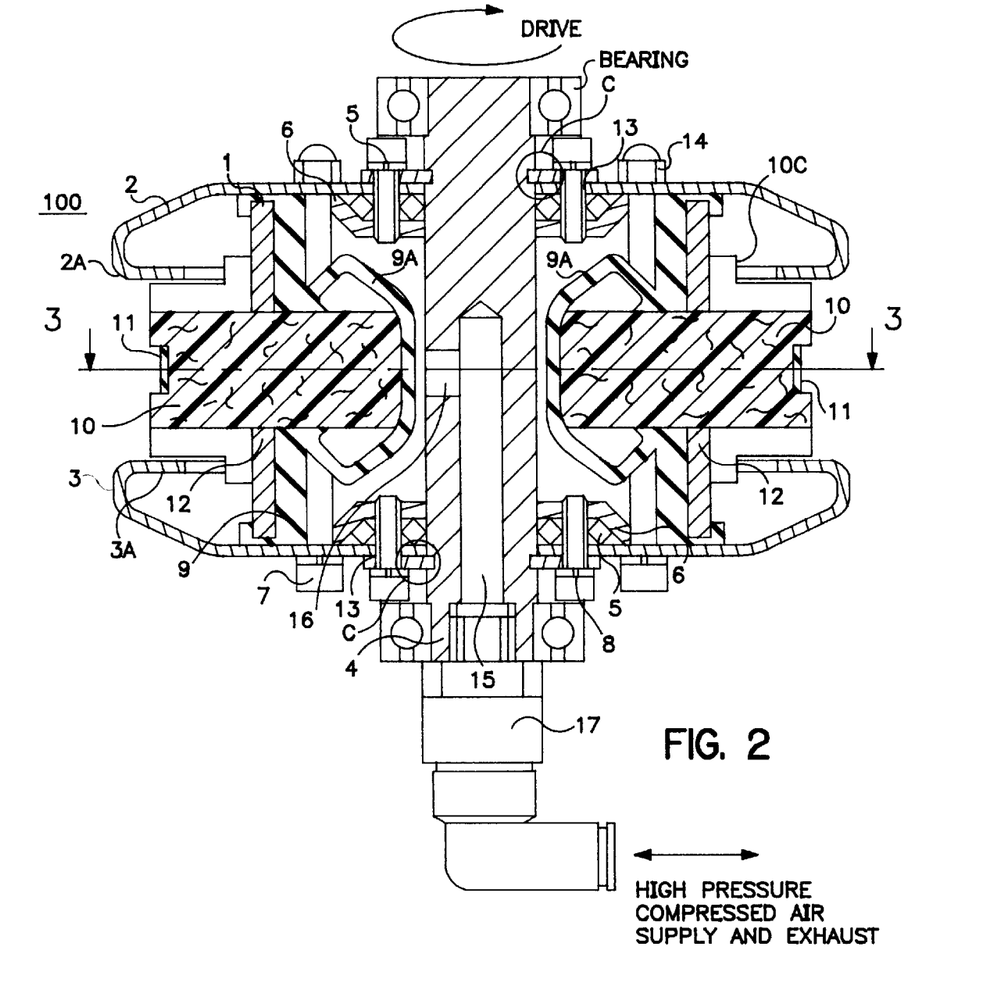
FIG. 2 is a cross sectional view of a variable outer diameter wheel used on a vehicle shown in FIG. 1.

Each variable outer diameter wheel 100 is supplied with compressed air from an air supply source, for example an air pump through a valve and a rotary air coupling 17 (FIG. 2). In the example shown in FIG. 1, the four variable outer diameter wheels 100 are connected to each other by a tube and to the compressed air supply via a pipe (not shown in FIG. 1). Oil or other fluid can be used instead of air. Instead of one pipe for the variable outer diameter wheels, four independent pipes can be connected to the air (fluid) pump.

A compressor attached to and part of the vehicle can be used or a separate compressor, a pump or a manual air pump (like a bicycle pump) can be used to supply the air to the wheels 100.

FIGS. 2 to 9 show drawings of a variable outer diameter wheel 100 in accordance with an exemplary embodiment of the present invention. The cylindrical wall of a pipe or drum 1 has a plurality of penetrating holes, for example four penetrating holes (apertures or ports) spaced 90 degrees apart. The pipe 1 is made of metal or hard material such as epoxy resin or fiber reinforced plastic (FRP) and is formed by machining a metal pipe by a numerical controlled lathe or injection molding of the resin.

The pipe 1 is disposed between side plates 2 and 3 and held by the rim portion of a sealing part 9. The edge portions of the side plates 2 and 3 are bent so that their cross sectional shapes are in the form of the letter C as shown in FIG. 2. The side plates 2 and 3 can be press formed from a metal plate, however, they can also be made of a resin such as FRP.

Pipe 1 is disposed on an axle 4. The side plates 2 and 3 are held in air tight relation to pipe 1 by means of bolts 8 through disc-shaped rubber packings 5 and disc-shaped packing holders 6 each having a central generally circular aperture. Rectangular shaped anti-rotation plates 13 having generally semi-circular notches are put into the H-cut grooves, at four locations (one each at upper and lower parts of the axle 4) as indicated by the letter C and fixed to the side plates 2 and 3 together with the disc-shaped packing holders 6 by the bolts 8.

A part of the disc-shaped rubber packing 5 is forced in the direction to cause the peripheral part of the central aperture to contact axle 4 and according to the torque applied to the bolts 8 rubber packing 5 makes a sealing function between the axle 4 and the inside of pipe 1. Accordingly, it is unnecessary to finish the surface of axle 4 to a fine finish and sufficient sealing is effective even with a rough surface of the steel of axle 4.

The side plates 2 and 3 and the pipe 1 are held in air tight relation by the bolts 7 and the nuts 14 and the rim portions 9C (upper and lower, in FIG. 6) of the sealing part 9.

Figure 6:
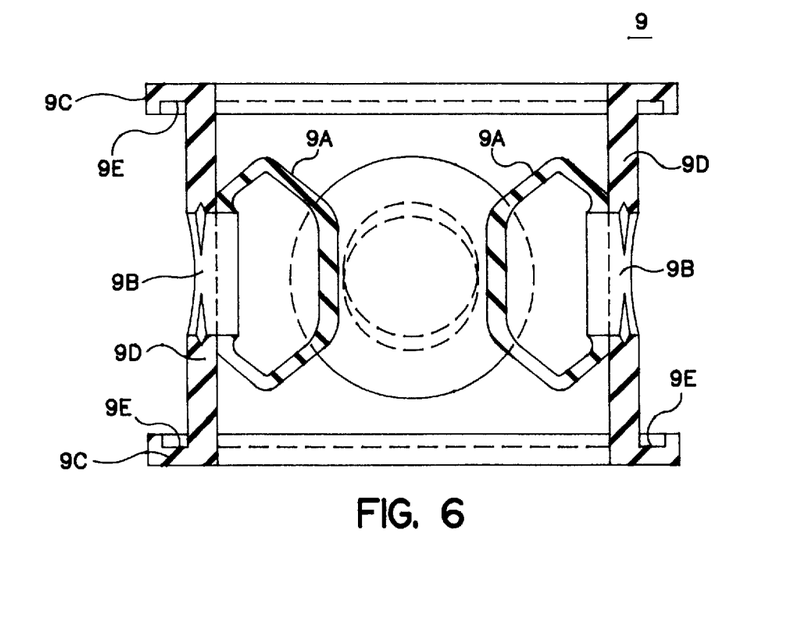
FIG. 6 is an enlarged cross sectional view of the sealing part included in the variable outer diameter wheel shown in FIG. 2.
Figure 7:
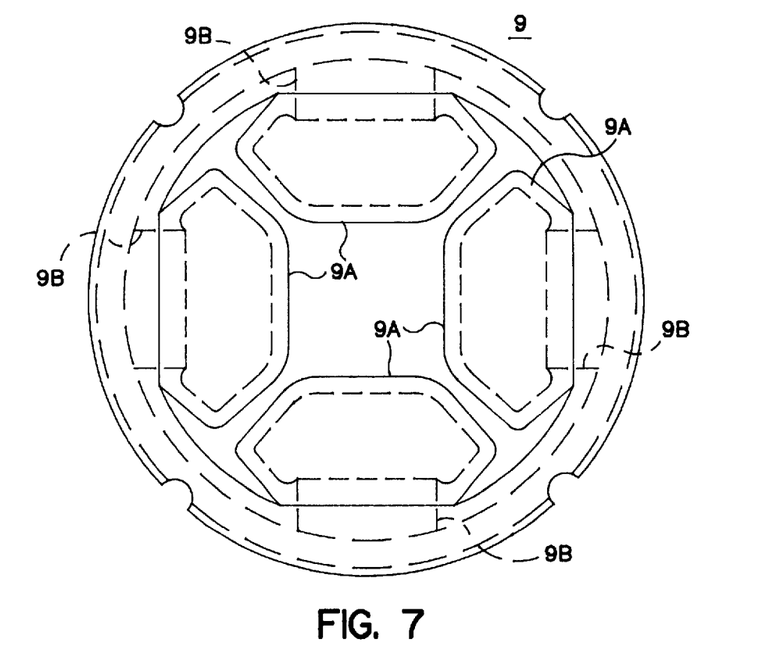
FIG. 7 is a cross sectional view of the sealing part shown in FIG. 6.

The sealing part 9 is formed by molding elastic material such as silicone rubber, rubber material such as butyl rubber or soft plastic in one unit as shown in FIGS. 6 and 7. Molding in one unit can be by, for example, casting or injection molding.

The sealing part 9 is tightly fitted into the pipe 1. As shown in FIGS. 6 and 7, sealing part 9 is composed of a cylindrical trunk 9D, penetrating holes 9B, diaphragms 9A, rim portions 9C and circular grooves 9E.

The penetrating holes 9B are provided at four positions facing the penetrating holes 12 provided on the cylindrical wall of the pipe 1 to support shafts 10A of sliders 10 which are fitted into the penetrating holes 9B and 12 so that the supporting shafts 10A can slide smoothly through the penetrating holes 9B and 12. The diaphragms 9A having a generally pot-shape form extend inside the cylindrical trunk 9D of sealing part 9.

The circular grooves 9E formed by rim portions 9C of sealing part 9 overlap the edge of the pipe 1 in order to make possible a tight seal between the side plate 2, the pipe 1 and the side plate 3 by tightening the bolts 7 and the nuts 14. Here, the shape of the diaphragms 9A of the sealing part 9 can be a bellows, a polyhedron or any other convenient shape.

The penetrating holes 12 on the cylindrical wall of the pipe 1 which support shafts 10A of the sliders 10 to move smoothly are tightly closed by the diaphragms 9A of the sealing part 9 as shown in FIG. 2.

Figure 8:
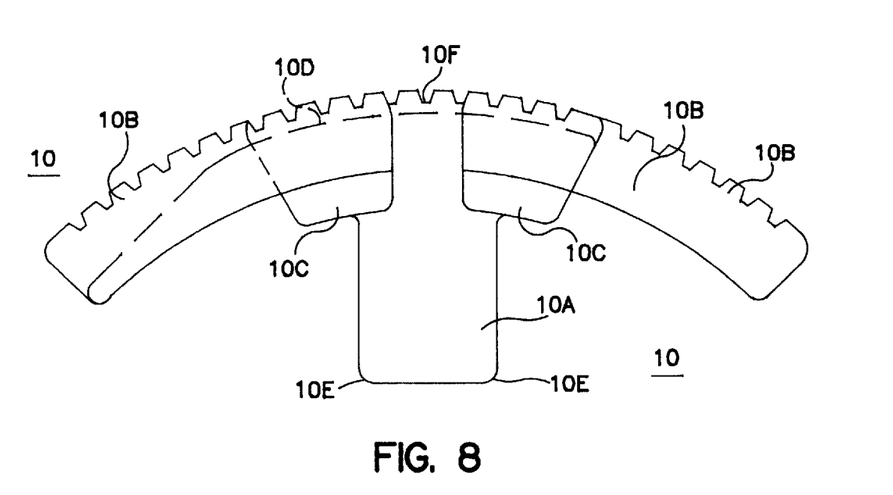
FIG. 8 is a side view of a slider included in a variable outer diameter wheel shown in FIG. 2.
Figure 9:
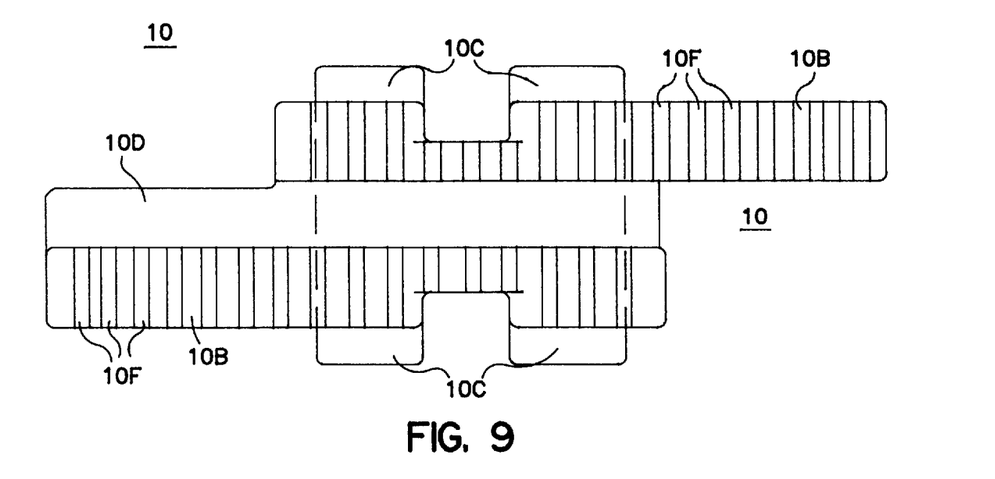
FIG. 9 is a top plan view of the slider shown in FIG. 8.

A side view and a top plan view of the sliders 10 are shown in FIGS. 8 and 9, respectively. The sliders 10 are constructed so that gutters 10D are between the arc-shaped wheel peripheral parts 10B. The arc-shaped wheel peripheral parts 10B are at an end of the supporting shaft 10A and form a wheel peripheral face. The sliders 10 are molded in a desired shape with resin such as FRP. They may be made by, for example, machining metal, die casting or injection molding metals or resins.

The grooves 10F are provided at evenly spaced intervals to increase friction when contacting the earth and to prevent slipping on a frozen road or a snow-clad road. A plurality of protruding parts such as spike pins or studs may be buried in a rubber of plastic lattice instead of the grooves 10F on the wheel peripheral part 10B to form spiked or studded tires.

A rubber coating, or plastic or rubber may be attached to the wheel peripheral part 10B to increase friction or to absorb shock and vibration when running on the earth.

The sliders 10 are constructed so that gutters 10D are put between the arc-shaped wheel peripheral parts 10B which are at an end of the supporting shafts 10A and form a wheel peripheral face. By providing the arc-shaped wheel peripheral parts with the shape as shown and with designated deviation, when the sliders are radially disposed at four positions 90 degrees apart the structure can prevent mutual interference of the arc-shaped wheel peripheral parts and form wheel peripheral parts which are continuous when the diameter of the wheel enlarges. The shape of the locations of the wheel peripheral parts 10B is not restricted to being symmetrical and they may be located like an alphabetical letter Y or S so that they become continuous.

Rubber ring 11 is disposed in the gutters 10D of the sliders 10. The rubber ring 11 has a function which is to push the sliders 10 (four pieces in the exemplary embodiment shown in FIG. 2) simultaneously towards the axis of the axle 4 and to restore the sliders to the original positions when the variable outer diameter wheel has a small wheel diameter. Instead of the rubber rings 11 used to restore the sliders 10 to the original positions, means to give negative pressure to diaphragms 9A, such as ring-shaped tension coil springs connecting their starting point and ending point or any other means may be used.

Compressed air is supplied to the cylindrical trunk 9D of the sealing part 9 by a designated timing signal through a rotary air coupling 17, a blind hole or passage 15 on the axis of the axle 4 and a transverse connecting hole 16.

Figure 4:
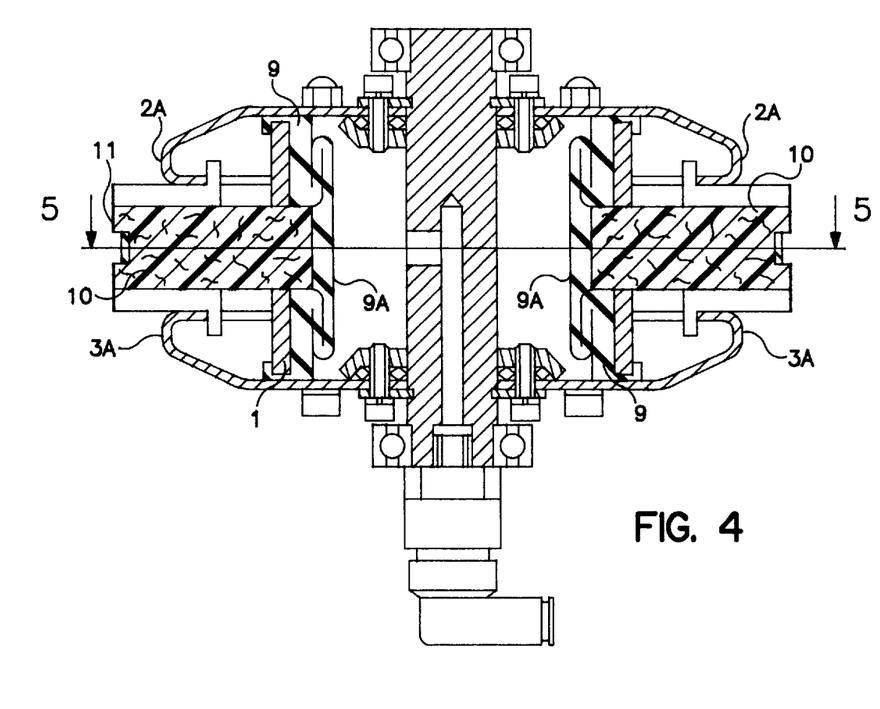
FIG. 4 is a cross sectional view of the variable outer diameter wheel shown in FIG. 2, after compressed air is supplied to the wheel.
Figure 5:
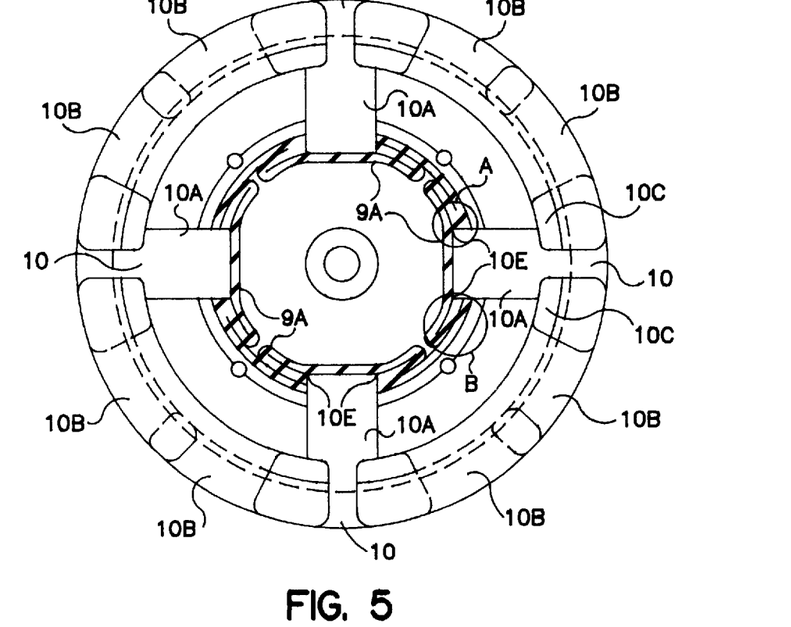
FIG. 5 is a cross sectional view of a variable outer diameter wheel taken along line 5—5 of FIG. 4.

The diaphragms 9A of the sealing part 9 shown in FIG. 4 and marked by B in FIG. 5 are pushed by the compressed air, deform from a pot-shape to a flat plate-shape and push supporting shafts 10A of the sliders 10 further out of penetrating holes 12 of pipe 1.

The end of the stroke of the sliders 10 pushed by the compressed air is a working limit (upper dead point) of the sliders 10 where the protruding parts 10C of the sliders 10 strike against the hook-shaped rim portions 2A and 3A of the C-shaped side plates 2 and 3, respectively.

The wheel peripheral parts 10B of the sliders 10 pushed outside the pipe 1 form a peripheral face having a desired larger outer diameter as shown in FIGS. 4 and 5. At the same time, they expand the rubber ring 11 fixed in the gutters 10D of the sliders 10.

The pressure resistance of cylindrical elastics made of rubber is usually about 2 kgf/cm$^2$ and is small.

In the present invention, compressed air of 2 to 5 kgf/cm$^2$ is supplied to the diaphragms 9A to support a vehicle itself, people, load and so on. At pressures used to enlarge the wheel, the diaphragms 9A made of soft rubber deform to flat plates and are pushed into sharp edges or into small gaps. Repeated action on the diaphragm 9A causes the soft surface of the diaphragm 9A to peel off little by little and eventually its pressure resistance strength decreases and the diaphragms 9A will burst. In order to prevent explosion or cracking of the diaphragms 9A from repeated working under high pressure, the edge parts of the supporting shafts 10A are made with round corners 10E as shown in FIG. 8.

Working with compressed air, the deformed portions of the diaphragms 9A are pushed to the inside wall of the cylindrical trunk 9D of the sealing part 9 and the round corners 10E of the supporting shafts 10A, as shown in the circle A in FIG. 5 to minimize bending distortion of the sealing part 9.

The diaphragms 9A constructed in accordance with the present invention could realize a working life over 2 million cycles under air pressure of more than 5 kgf/cm$^2$.

As already mentioned, when a vehicle runs on a clear road after running on a frozen road or a snow-clad road, the compressed air used to deform or flatten the diaphragms 9A is exhausted through the compressed air supplying hole 9 and passage 15 of the axle 4.

Figure 3:
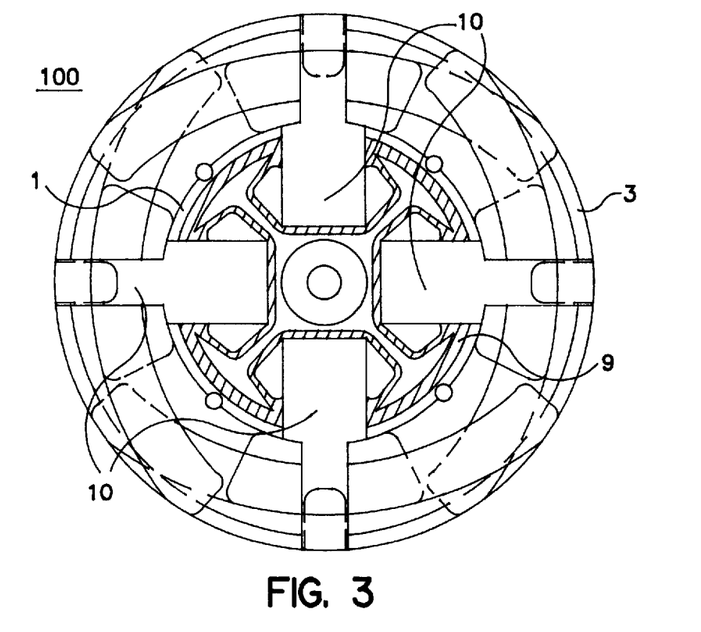
FIG. 3 is a cross sectional view of a variable outer diameter wheel taken along line 3—3 of FIG. 2.

As the air pressure decreases inside the sealing part 9, the supporting shafts 10A are pushed inside the pipe 1 by the tension of the rubber ring 11 to restore sliders 10 to their original position as shown in FIGS. 2 and 3. Then the peripheral face (outer diameter) of the wheel peripheral part 10B becomes smaller than the outer diameter of the side plates 2 and 3.

In addition to a variable outer diameter wheel in which the sliders are radially arranged, there can be other arrangements for the sliders.

Figure 10:
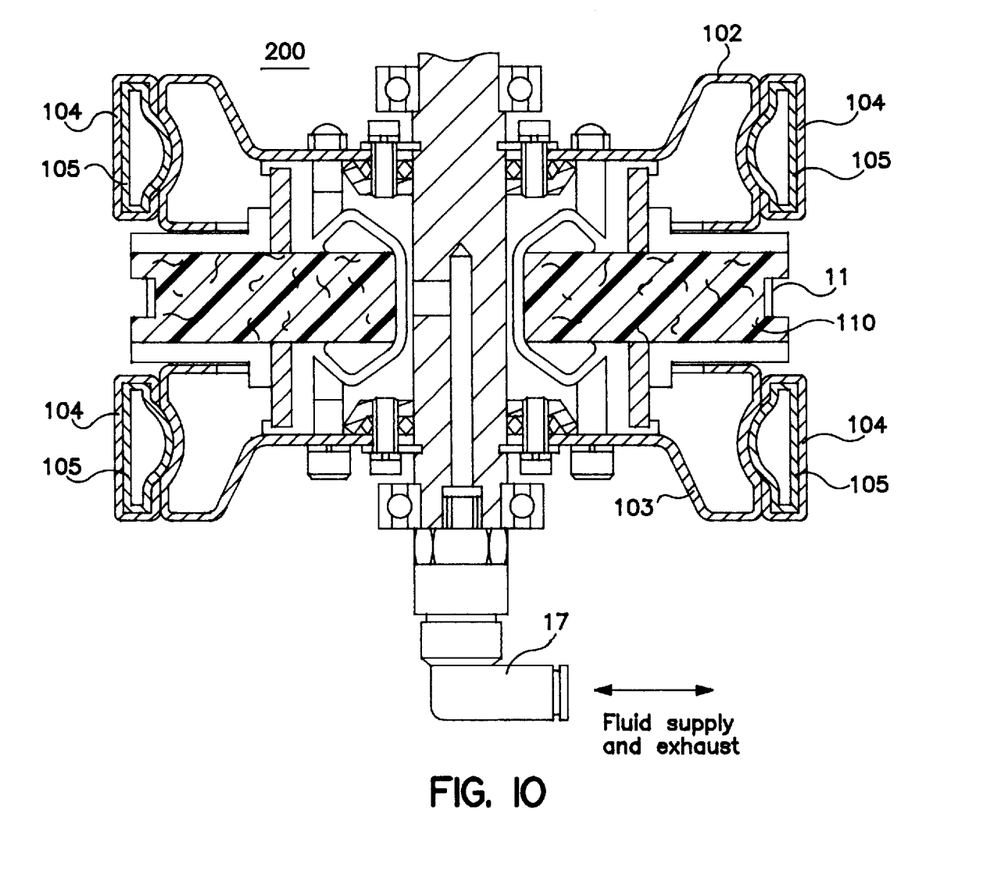
FIG. 10 is a cross sectional view of another variable outer diameter wheel for use with a vehicle shown in FIG. 1, taken in a plane including the axis of the axle.

FIG. 10 is a cross sectional view of a variation of a variable outer diameter wheel 200 for use with a vehicle shown in FIG. 1. Variable outer diameter wheel 200 is in principal quite similar to the variable outer diameter wheel 100 shown in FIG. 2.

The main differences are the shape of the side plates 102 and 103 adjusted so that tires 104 containing rubber inner tubes 105 are mounted on the peripheral face of side plates 102, 103.

The side plates 102 and 103 guide the four pieces of sliders 110 and restrict the distance they move. Further, the peripheral part of the side plates 102, 103 provide concave parts similar to that of a conventional wheel for attaching an automobile tire. The tires 104 are mounted with rubber inner-tubes 105 keeping fluid (usually air) at a designated pressure.

As for the shape of side plates 102 and 103 and the shapes of tubes 105 and tires 104, any other shapes can be used that are similar to those of conventional automobiles. Tires without tubes (tubeless tires) may be used in place of the tire 104 and tube 105.

Another exemplary embodiment of a variable outer diameter wheel 400 is shown in FIGS. 11, 12, 13 and 14. This embodiment includes a supporting axle having a fluid supply passage 132 inside the axle and a plurality of connecting holes 122 radially in the wall of the supply passage 132. The supply passage 132 is connected to a fluid supply (not shown). Sliders are fitted into penetrating hole 128 in wheels 400 to be able to slide in said penetrating hole and form a wheel peripheral face. The sliders 124 are constructed so they are pushed and moved in the direction to increase the outer diameter of wheel 400 by fluid supplied to the fluid supply passage 132 and holes 122.

The variable outer diameter wheel 400 has no sealing part 9, such as found in variable outer diameter wheel 100 of FIG. 2.

The variable outer diameter wheels 100 and 400 are manufactured with the gap between the sliders and the side plates to which the sliders fit being very small, e.g. several ten micrometers wide and are finished to fit in accordance with the H7f6 fitting grade. 47 refers to the tolerance on the hole or bearing side as f6 refers to the tolerance of the shaft. Grade H7f6 denotes about a 20 micrometer gap. Finishing to this degree results in the outer diameter being small and the variable outer diameter wheel is compact.

Figure 11:
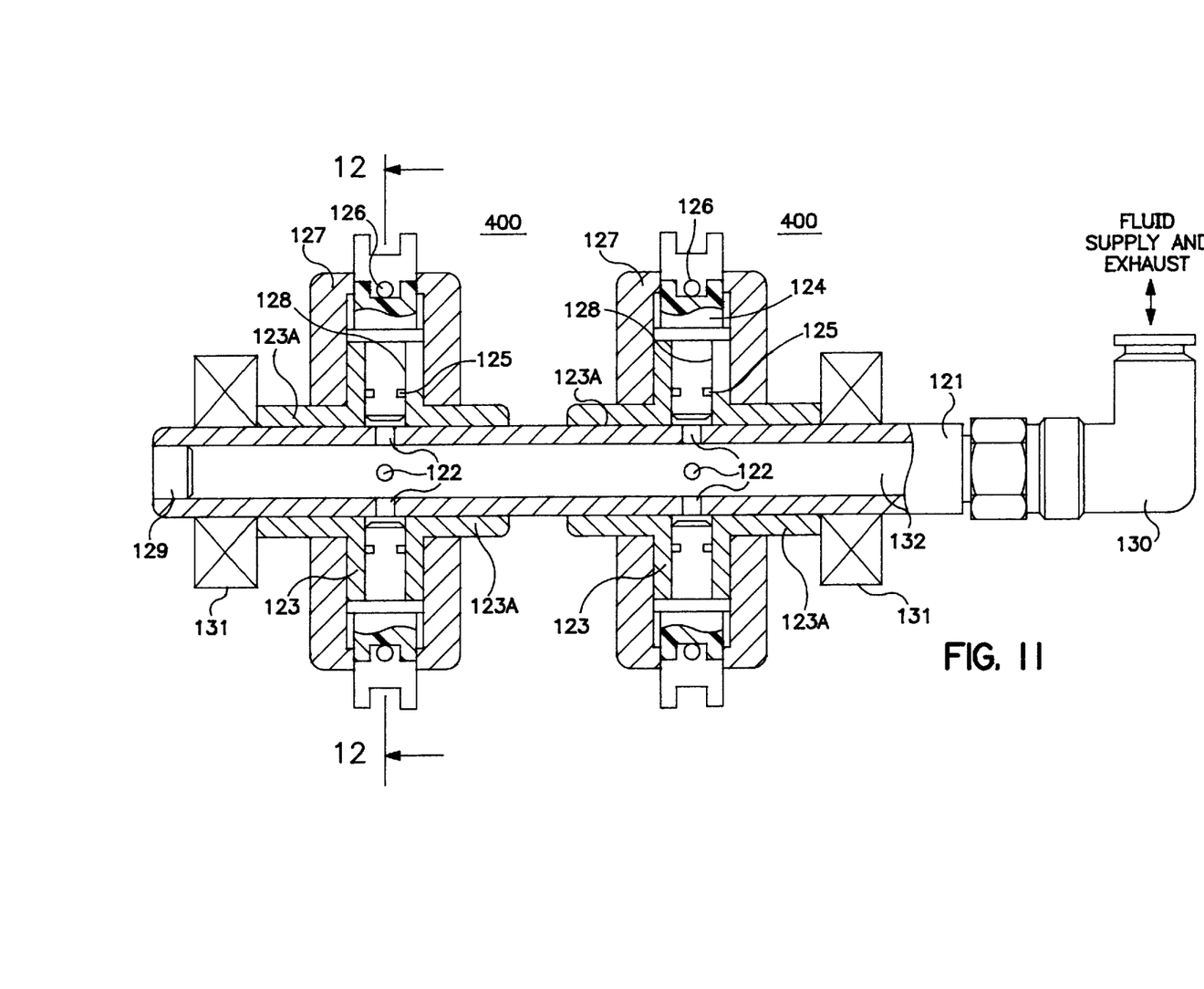
FIG. 11 is a cross sectional view of still another variable outer diameter wheel for use with the vehicle shown in FIG. 1, the view taken in a plane perpendicular to the axis of the axle.
Figure 12:
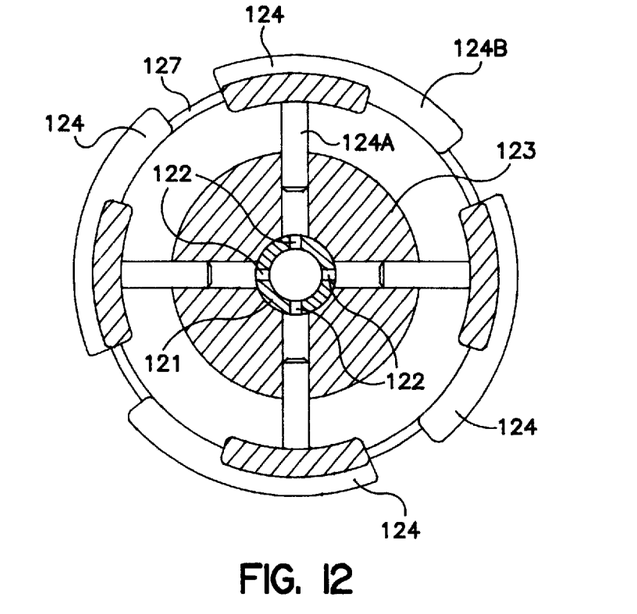
FIG. 12 is a cross sectional view of the variable outer diameter wheel taken along line 12—12 of FIG. 11.
Figure 13:
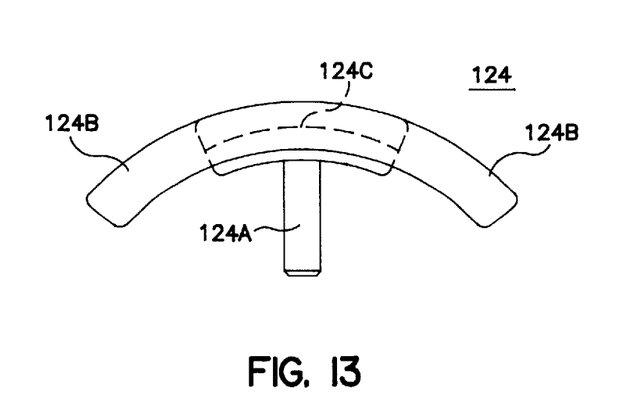
FIG. 13 is a side view of a slider included in the variable outer diameter wheel shown in FIG. 11.
Figure 14:
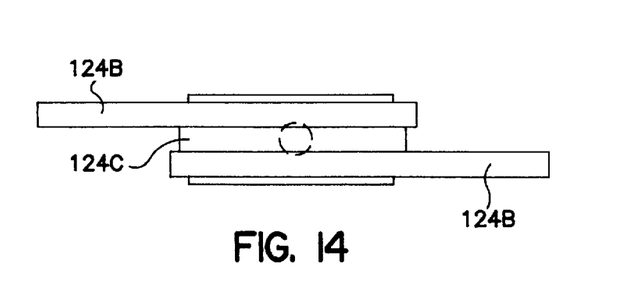
FIG. 14 is a top plan view of the slider shown in FIG. 13.

FIG. 11 is a cross sectional view of two variable outer diameter wheels 400 attached at two positions on the hollow axle 121. FIG. 12 is a cross sectional view taken along line 12—12 of FIG. 11 and shows the position of the sliders when air is supplied to the hollow axle 121 and the wheel outer diameter enlarges. Rings 125 are omitted from this view for ease of illustration. FIGS. 13 and 14 are a side view and a top plan view respectively of the slider 124.

Referring to FIG. 11, one end of the hollow axle 121 having a longitudinal passage 132 for supplying fluid (for example air) along the axis of the passage 132 of hollow axle 121 is closed by a plug 129 on one end and a rotary air coupling 130 is attached to the other end of the hollow axle 121. Air of a designated pressure is supplied to the passage 132 of axle 121 through coupling 130.

The hollow axle 121 has a fixed length and is supported by the bearings 131 provided at both ends of the axle 121.

In FIG. 11, as a matter of convenience, the (distance) span between two variable outer diameter wheels 400 is drawn much smaller than for the actual span of a vehicle.

The axle 121 has four connecting holes 122 in the wall of passage 132 of hollow axle 121 radially positioned 90 degrees apart for each variable outer diameter wheel 400. Thus the hollow axle 121 has total of eight connecting passages (holes) 122.

The main disks 123 for supporting sliders 124 are mounted on hollow axle 121. As shown in FIG. 11, two main disks 123 are mounted on the hollow axle 121. The main disk 123 include four penetrating holes 128 positioned over a connecting hole 122 so that each penetrating hole 128 is connected to the passage 132 through a connecting hole 122.

Sliders 124 are fitted into each penetrating hole 128 of the main disk 123 so that the sliders 124 can smoothly slide in the penetrating holes 128. In FIG. 11, four sliders 124 are fitted into the main disk 123. The slider 124 includes a supporting shaft 124A and a wheel peripheral part 124B, similar to the slider 10 of FIG. 2. The supporting shaft 124A has a designated clearance (gap) for fitting into the penetrating hole 128 and is finished and fit in accordance with standard H7f6. One or two sealing rings 125 are attached around the supporting shaft 124A of the slider 124 at one or two positions (in FIG. 11, one position is shown) to prevent air leak and dust infiltration.

The surface of the supporting shaft 124A is finished to a smooth surface approaching a mirror surface by turning or grinding. When the slider 124 is made of resin or the like, however, a molding die with improved surface roughness may be used and finishing work for the slider itself may be omitted.

The slider 124 provides two arc-shaped wheel peripheral parts 124B extending equally from the shaft 124 and a gutter 124C is provided between the two wheel peripheral parts 124B as shown in FIG. 14. The shape of the wheel peripheral part 124B of the slider 124 is similar to that of the slider 10 of FIG. 2 and the function and the construction of the tension coil spring 126 is similar to the rubber ring 11 of the assembly of FIG. 2. Enlarging of the outer diameter of wheel 400 is done in a manner similar to that of the variable outer diameter wheel 100, thus the explanation is omitted.

In FIG. 11, the positions of the sliders 124 indicated by broken lines show the position of the outer diameters of the wheels when enlarged by air.

Two side plates 127 fixed on the outsides of the main disk 123 restrict the stroke end of the slider 124 and prevent rotation of supporting shaft 124A of the slider 124.

The side plates 127 prevent slider 124 from falling out of the penetrating hole 128 and define a maximum diameter of the wheel 400 when the desired air pressure is introduced into passage 132.

Similar to the variable outer diameter wheel 200 shown in FIG. 10, a construction may be used in which either a tire made of rubber or plastic or a tire containing a tube filled with fluid having designated pressure (not shown) is attached outside the cylindrical (peripheral) face of the two side plates 127 forming a variable outer diameter wheel 400 which has a tire for shock absorbing and safety functions.

Other methods and devices for holding the sliders 124 may be used for the variable outer diameter wheel 400 shown in FIG. 11. For example, a construction in which a main disk 123 and side plates 127 are made in one unit, a construction in which holding is done only by side plates without a main disk 123 or a construction in which a main disk 123, side plates 127 and a hollow axle 121 are made in one unit.

Any material such as metal, resin or composite material may be used for the parts included in the variable outer diameter wheel of the present invention. Any manufacturing means such as die casting, injection molding press forming or cutting may be used to make the parts.

In addition to using variable outer diameter wheels on automobiles, applying the variable outer diameter wheels to farming vehicles and wheel chairs makes easy running on an irregular road, a weak road or steps of a staircase. Applying them to electric automobiles makes it possible to change speed without a speed change mechanism such as gears or fluid and thus it is possible to improve running efficiency.

A variable outer diameter wheel of the present invention has a very simple construction and does not result in excess tension to the diaphragms. Only a little compression and a small bending distortion occur when the diaphragms deform from a pot-shape to a flat plate-shape. Accordingly, the diaphragms are not subject to fatigue when repeatedly inflated and deflated over two million cycles and against compressed air of 5 kgf/cm$^2$, Because the moving range of the sliders is restricted by the side plates, the maximum wheel outer diameter which the sliders determine is always constant and independent of the pressure strength of the fluid supplied to the diaphragms.

Thus, a vehicle having variable outer diameter wheels prevents slip on a frozen or a snow-clad road without increasing air pollution. Applying them to farming vehicles and wheel chairs makes easy running independent of the road surface condition. Further, applying them to electric automobiles makes improved running efficiency. Thus, a variable outer diameter wheel having a simple construction and good fatigue resistance can be achieved.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A vehicle having variable outer diameter wheels, each wheel comprising:
   a supporting part having an internal fluid supply passage and a plurality of penetrating holes disposed radially around a side wall of said supporting part and connected to said fluid supply passage;
   a plurality of sliders, each disposed in a respective one of said penetrating holes, said sliders forming overlapping wheel peripheral parts;
   and moved by fluid supplied to said fluid supply passage in a direction so that the outer diameter of said variable outer diameter wheel enlarges; and an axle for coupling said wheel to said vehicle.

2. A vehicle having variable outer diameter wheels as recited in claim 1, wherein each of said sliders comprises in combination:

an arc part forming a wheel peripheral part, said arc part having a designated angle, said arc part attached to a supporting shaft; wherein said supporting shaft of said slider is disposed in said penetrating holes.

3. A vehicle having variable outer diameter wheels as recited in claim 2, wherein:

a material selected from the group consisting of rubber, and plastic or a combination thereof is provided on said wheel peripheral parts.

4. A vehicle having variable outer diameter wheels as recited in claim 1, wherein a tire selected from the group comprising a tubeless tire or a tire having a rubber tube is attached on an outer edge of side plates mounted on said support part.

5. A vehicle having variable outer diameter wheels, each wheel comprising:

a generally cylindrical supporting part having a cylindrical wall in which are formed a plurality of penetrating holes;

a plurality of diaphragms disposed adjacent to and inward of said penetrating holes;

sliders disposed in said penetrating holes, said sliders adapted to slide in said penetrating holes and form overlapping wheel peripheral parts; and moved through pressure exerted on said diaphragms by fluid supplied inside said supporting part causing the outer diameter of said variable outer diameter wheel to enlarge; and an axle for coupling said wheel to said vehicle.

6. A vehicle having variable outer diameter wheels as recited in claim 5, wherein said sliders comprise arc parts forming wheel peripheral parts with a designated angle disposed on supporting shafts fitting into said penetrating holes.

7. A vehicle having variable outer diameter wheels as recited on claim 6, wherein:

a material selected from the group consisting of rubber, plastic or a combination thereof is provided on said wheel peripheral parts.

8. A vehicle having variable outer diameter wheels as recited in claim 5, wherein:

a tire selected from the group comprising a tubeless tire or a tire having a rubber inner tube is attached on an outer edge of side plates mounted on said supporting part.

9. A vehicle having variable outer diameter wheels comprising:

sealing parts which have diaphragms fitted against a plurality of penetrating holes inside a pipe having said penetrating holes;

sliders forming wheel peripheral parts fitted into said penetrating holes so that said sliders can slide in said penetrating holes;

said sealing parts and said pipe held in air-tight relationship between side plates provided on both ends of said pipe;

said sliders are moved by fluid introduced into said pipe in the direction that the outer diameters of said variable outer diameter wheels enlarge; and a plurality of axles, each for coupling a respective one of said wheels to said vehicle.

10. A vehicle having variable outer diameter wheels as recited in claim 9, wherein said sliders comprise:

arc-shaped parts forming wheel peripheral parts with a designated angle disposed on supporting shafts fitting into said penetrating holes.

11. A vehicle having variable outer diameter wheels as recited in claim 10, wherein:

a material selected from the group consisting of rubber, plastic and a combination thereof is provided on said wheel peripheral parts.

12. A vehicle having variable outer diameter wheels as recited on claim 9, wherein:

a tubeless tire or a tire having a rubber inner tube is attached on an outer edge of said side plates.

13. A variable outer diameter wheel comprising:

a supporting part having the shape of a pipe or drum, said supporting part having a fluid supplying passage and a plurality of penetrating holes disposed radially and equidistant around a side wall of said supporting part and, said supporting part connected to said fluid supplying passage;

a slider disposed in each of said penetrating holes in said supporting part, said sliders adapted to slide in said penetrating holes and form overwheel peripheral parts;

said sliders moved by fluid supplied into said fluid supply passage to move said sliders in a direction so that the outer diameter of said variable outer diameter wheel enlarges; and a tire selected from the group comprising a tubeless tire or tire having a rubber inner tube mounted on said supporting part.

14. A variable outer diameter wheel as recited in claim 13, wherein said sliders comprise:

arc-shaped portions forming wheel peripheral parts with a designated angle mounted on supporting shafts disposed in said penetrating holes.

15. A variable outer diameter wheel as recited in claim 14, wherein:

a material selected from the group consisting of rubber, plastic, and a combination thereof is provided on said wheel peripheral parts.

16. A variable outer diameter wheel comprising:

a supporting part having a plurality of penetrating holes disposed radially and equidistant around an outer cylindrical face surface of a cylindrical trunk of said supporting part with diaphragms facing said penetrating holes;

sliders disposed in said penetrating holes, said sliders adapted to slide in said penetrating hole, and form overlapping wheel peripheral parts;

said sliders moved in said holes perpendicular to the cylindrical face of said supporting part by said diaphragm facing said penetrating holes;

said sliders moved by fluid supplied inside said supporting part in a direction so that the outer diameter of said variable outer diameter wheel enlarges; and a tire selected from the group consisting of a tubeless tire or a tire having a rubber inner tube attached around the cylindrical face of said supporting part.

17. A variable outer diameter wheel as recited in claim 16, wherein said sliders comprise:

arc-shaped parts forming wheel peripheral parts with a designated angle disposed on supporting shafts fitting into said penetrating holes.

18. A variable outer diameter wheel as recited in claim 17, wherein:

a material selected from the group consisting of rubber, plastic, or a combination thereof is provided on said wheel peripheral parts.

19. A variable outer diameter wheel for use with a vehicle comprising:

sealing parts having diaphragms facing a plurality of penetrating holes disposed inside a supporting pipe having penetrating holes;

sliders forming wheel peripheral parts are disposed in said penetrating holes so that said sliders can slide in said penetrating holes;

said sealing parts and said pipe are held in air-tight relationship between side plates provided on both ends of said pipe; wherein said sliders are moved by fluid introduced into said pipe to move said sliders outwardly from said holes to increase the diameter of said variable outer diameter wheel; and an axle for coupling said wheel to said vehicle.

20. A variable outer diameter wheel as recited in claim 19, wherein said sliders comprise:

arc-shaped parts forming wheel peripheral parts with a designated angle disposed on supporting shafts fitting into said penetrating holes.

21. A variable outer diameter wheel as recited in claim 20, comprising:

a material selected from the group consisting of rubber, plastic, or a combination thereof and a spike pin are disposed in said arc-shaped wheel peripheral parts.

22. A variable outer diameter wheel as recited in claim 20, wherein:

a tire selected from the group consisting of a tubeless tire or tire having a rubber inner tube attached around the cylindrical face of side plates fixed to said supporting pipe.

* * * * *